(12) United States Patent
Gatson et al.

(10) Patent No.: US 10,740,973 B2
(45) Date of Patent: Aug. 11, 2020

(54) ULTRASONIC COLLISION MANAGEMENT IN VIRTUAL, AUGMENTED, AND MIXED REALITY (XR) APPLICATIONS

(71) Applicant: Dell Products, L.P., Round Rock, TX (US)

(72) Inventors: Michael S. Gatson, Austin, TX (US); Mark Allan Casparian, Miami, FL (US); Thanh T. Tran, Houston, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/631,963

(22) Filed: Jun. 23, 2017

(65) Prior Publication Data
US 2018/0374264 A1    Dec. 27, 2018

(51) Int. Cl.
| | | |
|---|---|---|
| *G06T 19/00* | (2011.01) | |
| *G01S 1/74* | (2006.01) | |
| *G01S 15/93* | (2020.01) | |
| *G01S 15/87* | (2006.01) | |
| *G01S 15/04* | (2006.01) | |
| *G01S 15/89* | (2006.01) | |
| *G01S 15/58* | (2006.01) | |
| *G01S 15/42* | (2006.01) | |
| *G01S 15/86* | (2020.01) | |

(52) U.S. Cl.
CPC .............. *G06T 19/006* (2013.01); *G01S 1/74* (2013.01); *G01S 15/04* (2013.01); *G01S 15/42* (2013.01); *G01S 15/58* (2013.01); *G01S 15/86* (2020.01); *G01S 15/87* (2013.01); *G01S 15/89* (2013.01); *G01S 15/93* (2013.01); *G06T 2210/21* (2013.01)

(58) Field of Classification Search
CPC ..... G02B 27/0172; G06F 3/012; G06F 3/013; G06T 19/006
See application file for complete search history.

(56) References Cited

U.S. PATENT DOCUMENTS

| | | | | |
|---|---|---|---|---|
| 2012/0280917 | A1* | 11/2012 | Toksvig | ............... G06F 1/1626 345/173 |
| 2014/0013344 | A1* | 1/2014 | Taxier | ................... H04N 21/43 725/10 |
| 2015/0227778 | A1* | 8/2015 | Cervantes | .......... G02B 27/0172 348/47 |

(Continued)

OTHER PUBLICATIONS

The Magic Barrier Tape: a Novel Metaphor for Infinite Navigation in Virtual Worlds with a Restricted Walking Workspace, ACM 978-1-60558-869-8/09/0011, year 2009.*

(Continued)

*Primary Examiner* — Ming Wu
(74) *Attorney, Agent, or Firm* — Fogarty LLP

(57) ABSTRACT

Systems and methods for ultrasonic collision management in virtual, augmented, and mixed reality (xR) applications are described. In some embodiments, an Information Handling System (IHS) may include a processor and a memory coupled to the processor, the memory having program instructions stored thereon that, upon execution by the processor, cause the IHS to: execute an xR application to display an xR image to a user of the IHS; and detect, via an ultrasonic sensor coupled to the processor, a potential physical interaction between the user and a physical object during execution of the xR application.

17 Claims, 5 Drawing Sheets

(56) References Cited

U.S. PATENT DOCUMENTS

| | | | | |
|---|---|---|---|---|
| 2015/0324646 | A1* | 11/2015 | Kimia | G06T 7/80 |
| | | | | 348/62 |
| 2015/0347075 | A1* | 12/2015 | Levesque | G06F 3/1423 |
| | | | | 345/3.1 |
| 2017/0123747 | A1* | 5/2017 | Rochford | G02B 27/017 |
| 2017/0197142 | A1* | 7/2017 | Stafford | G06F 3/017 |
| 2017/0212585 | A1* | 7/2017 | Kim | G06F 3/013 |

OTHER PUBLICATIONS

Shape Recognition and Position Measurement of an Object Using an Ultrasonic Sensor Array,Kozo Ohtani1 and Mitsuru Baba2, May 2012.*

NPL: Shape Recognition and Position Measurement of an Object Using an Ultrasonic Sensor Array, May 2012 (Year: 2012).*

NPL: The Magic Barrier Tape: a Novel Metaphor for Infinite Navigation in Virtual Worlds with a Restricted Walking Workspace, ACM 978-1-60558-869-8/09/0011, year 2009 (Year: 2009).*

\* cited by examiner

ULTRASONIC COLLISION MANAGEMENT IN VIRTUAL, AUGMENTED, AND MIXED REALITY (XR) APPLICATIONS

FIELD

The present disclosure generally relates to information handling systems (IHSs), and, more particularly, to systems and methods for ultrasonic collision management in virtual, augmented, and mixed reality (collectively referred to as "xR") applications.

BACKGROUND

The goal of virtual reality (VR) is to immerse users in virtual environments. A conventional VR device obscures a user's real-world surroundings, such that only digitally-generated images remain visible. Those images are presented on a display such as, for example, an organic light-emitting diode or "OLED" panel housed within a head-mounted device (HMD) or the like.

In contrast with VR, augmented reality (AR) and mixed reality (MR) operate by overlaying digitally-generated content or entities (e.g., characters, text, hyperlinks, images, graphics, etc.) upon the user's physical surroundings. A typical AR/MR device includes a projection-based optical system that displays content on a translucent or transparent surface (e.g., plastic, glass, etc.) of an HMD, heads-up display (HUD), eyeglasses, or the like.

In modern implementations, xR headsets (i.e., VR, AR, or MR) may be wirelessly tethered to an external computer. Conventional xR headsets do not have as much processing capability as the external computer, so the external computer is used to generate the digital images to be displayed by the xR headset. The xR headset transmits information to the computer regarding the state of the user (e.g., head position, proximity to other users, etc.), which in turn enables the external computer to determine which image to show to the user next, and from which perspective, as the user moves around and/or changes head position.

The inventors hereof have recognized that xR applications are becoming more interactive, and that roaming is now an important element of the xR experience. However, allowing a user to move around a room, whether that user is fully or partially immersed in an xR application, can lead to physical collisions between the user, physical objects, and other users or persons present in that room. To address these, and other concerns, the inventors hereof have developed systems and methods for ultrasonic collision management in xR applications.

SUMMARY

Embodiments of systems and methods for ultrasonic collision management in virtual, augmented, or mixed reality (xR) applications are described. In an illustrative, non-limiting embodiment, an Information Handling System (IHS) may include: a processor and a memory coupled to the processor, the memory having program instructions stored thereon that, upon execution by the processor, configure and/or cause the IHS to: execute a virtual, augmented, or mixed reality (xR) application to display an xR image to a user of the IHS; and detect, via an ultrasonic sensor coupled to the processor, a potential physical interaction between the user and a physical object during execution of the xR application.

In some cases, the IHS may include an xR headset worn by the user during execution of the xR application. The ultrasonic sensor may include an ultrasonic transducer array. The physical object may be transparent or translucent, and the physical interaction may include a collision between the user and the physical object. Additionally or alternatively the physical object may be another user of another IHS executing another instance of the xR application.

Additionally or alternatively, the program instructions may configure and/or cause the IHS to provide feedback to the user regarding the potential physical interaction. The IHS further may include a haptic actuator coupled to the processor, and the feedback may include haptic feedback. For example, the feedback may direct the user to prevent the physical interaction. Conversely, the feedback may direct the user to pursue the physical interaction.

Additionally or alternatively, the program instructions may configure and/or cause the IHS to render an aspect of the physical object as a digitally-generated entity in the xR image, and the aspect may include at least one of: a color, position, a shape, or a size of the physical object.

Additionally or alternatively, the program instructions may configure and/or cause the IHS to indicate, using the digitally-generated entity, whether the physical object is stationary or in motion. The digitally-generated entity may be superimposed or displayed alongside at least a portion of the physical object or a digital representation of the physical object in the xR image.

The physical object may include another user of another IHS participating in the xR application, and the digitally-generated entity may identify a role of the user in the xR application. The xR application may include a video game.

Additionally or alternatively, the program instructions may configure and/or cause the IHS to identify an aspect of the physical object using the ultrasonic sensor. The aspect may include at least one of: identity, position, velocity, acceleration, size, or shape of the physical object.

Additionally or alternatively, the program instructions may configure and/or cause the IHS to calculate a distance between the user and the physical object. Additionally or alternatively, the program instructions may configure and/or cause the IHS to: identify, using a depth camera coupled to the processor, a feature selected from the group consisting of: a user's arm's length, or a user's height; and adjust the distance according to the feature.

In another illustrative, non-limiting embodiment, a method may implement one or more of the aforementioned operations. In yet another illustrative, non-limiting embodiment, a hardware memory storage device may have program instructions stored thereon that, upon execution by an IHS, configure and/or cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein provide systems and methods for ultrasonic collision management in virtual, augmented, and mixed reality (collectively referred to as "xR") applications. These techniques are particularly useful in xR applications that employ head-mounted devices (HMDs), Heads-Up Displays (HUDs), eyeglasses, or the like (collectively referred to as "xR headsets" or simply "headsets").

In some implementations, ultrasonic transceivers may be embedded in an xR headset, backpack, or vest. A mapping procedure may be performed to detect the user's environment. Wideband microphones may be employed to detect sounds generated by a human, up to 50 kHz. Beamforming may be used to locate broadband sounds generated by each user or physical object, and to build a sound profile of each user or object.

As such, these systems and methods may monitor the sound field around the user and determine the distance between users, as well as from the walls and other objects. These systems and methods may further provide feedback (e.g., using haptic actuators also embedded in the xR headset, backpack, or vest) to the user regarding a potential physical interaction, such as a collision or the like, in order for the user to avoid or actively pursue that interaction while the xR application is executing.

Figure 1A:
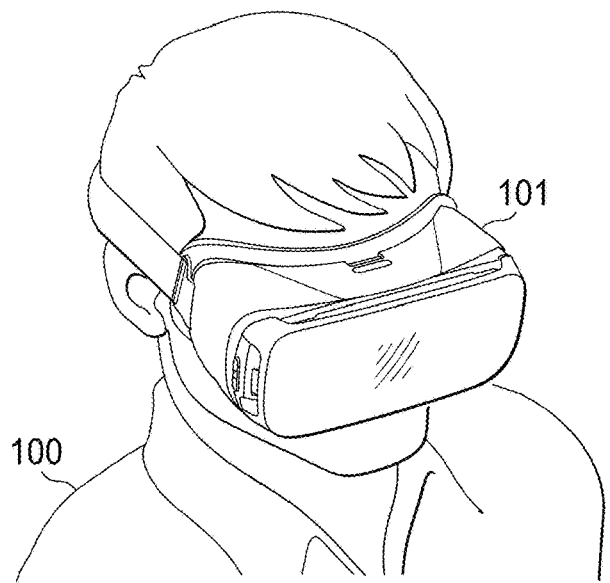
FIGS. 1A and 1B illustrate a non-limiting example of a headset used in a virtual, augmented, or mixed reality (xR) application according to some embodiments.
Figure 1B:
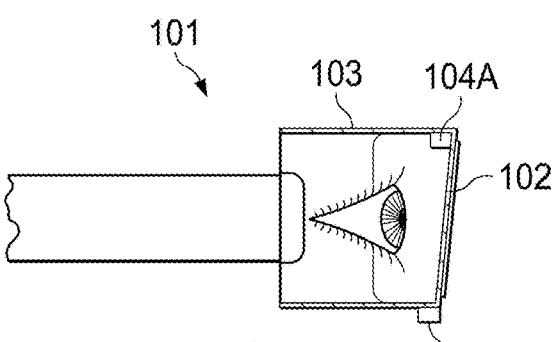

FIGS. 1A and 1B illustrate an example of an xR headset according to some embodiments. As shown, user 100 wears xR headset 101 around their heads and over their eyes. In some applications (e.g., AR and MR), user 100 may see their physical environment via a see-through a display system, glass, and/or lens 102 mounted on xR headset frame or body 103. Display(s) 102 may show information in the form of digital entities (e.g., characters, text, hyperlinks, images, graphics, etc.) overlaying a visible, physical environment in the user's field of view. In some cases, these digital entities may be relevant to a physical object located within the environment. Additionally or alternatively, display(s) 102 may completely immerse the user is a purely virtual, digital environment (e.g., VR) such that, for practical purposes, the physical environment is no longer visible to the user.

Display 102 may include a liquid crystal display (LCD) display 102 with a backlight or the like. In other cases, display 102 may include one or more transparent or translucent organic light-emitting diode (OLED) displays comprising one or more flexible sheets of organic electroluminescent material. Additionally or alternatively, an optical projector device may be aimed at display 102, which may include a projection display or the like.

In some cases, a first display portion may be disposed in front of the user's right eye, and a second display portion may be disposed in front of the user's left eye. Alternatively, a single display may be used for both eyes.

In various implementations, xR headset 101 also includes sensors 104A-N mounted on frame or body 103. For example, sensors 104A-N may include any number of cameras (e.g., IR cameras, B&W cameras, or any other type of camera), ambient light sensors (ALS), inertial sensors (e.g., accelerometers, etc.), ultrasonic transducers, haptic actuators, etc.

Figure 2:
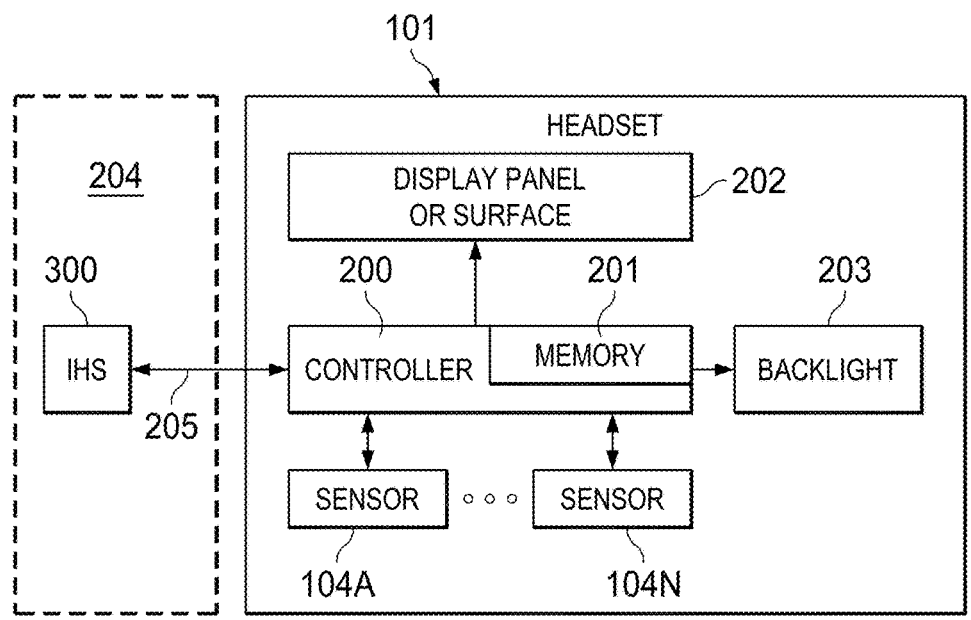
FIG. 2 is a block diagram of non-limiting examples of xR headset components according to some embodiments.

FIG. 2 is a block diagram of non-limiting examples of xR headset 101 components according to some embodiments. As depicted, controller 200 includes hardware memory storage device 201 having program instructions stored thereon that, upon execution by controller 200, cause xR headset 101 to create and/or display an all-immersive virtual environment; and/or to overlay digitally-created content or images on panel or surface 202 (e.g., an LCD panel, an OLED film, a projection surface, etc.) in place of and/or in addition to the user's natural visual perception of the real-world.

As such, controller 200 drives panel or surface 202 and/or backlight 203 (e.g., an LED light) of display 102 in order to provide the user with a visual xR experience. Moreover, controller 200 may employ sensors 104A-N to implement a number of tracking techniques usable in the rendering of the xR images (e.g., the user's own location, head position, etc.) for user 100, and/or to change one or more aspects of xR headset 101's display 102 and/or digitally-created content or images (e.g., relative size of other entities, perspective, field of view, etc.).

In some implementations, controller 200 may communicate with external IHS 300 via wired or wireless connection 205 (e.g., WiGig, WiFi, etc.). For example, if IHS 300 has more processing power and/or better battery life than xR headset 101, it may be used to offload some of the processing involved in the creation of the xR experience. In some cases, IHS 300 may be built into (or otherwise coupled to) backpack or vest 204, wearable by user 100.

As a person of ordinary skill in the art will recognize in light of this disclosure, FIG. 2 shows portions of xR headset 101 that are relevant for understanding the systems and methods described herein. Yet, it should be noted that power systems and other components may also be present. In some cases, xR headset 101 may itself be an IHS, such that one or more elements of IHS 300 may be built on frame or body 103 of xR headset 101.

Figure 3:
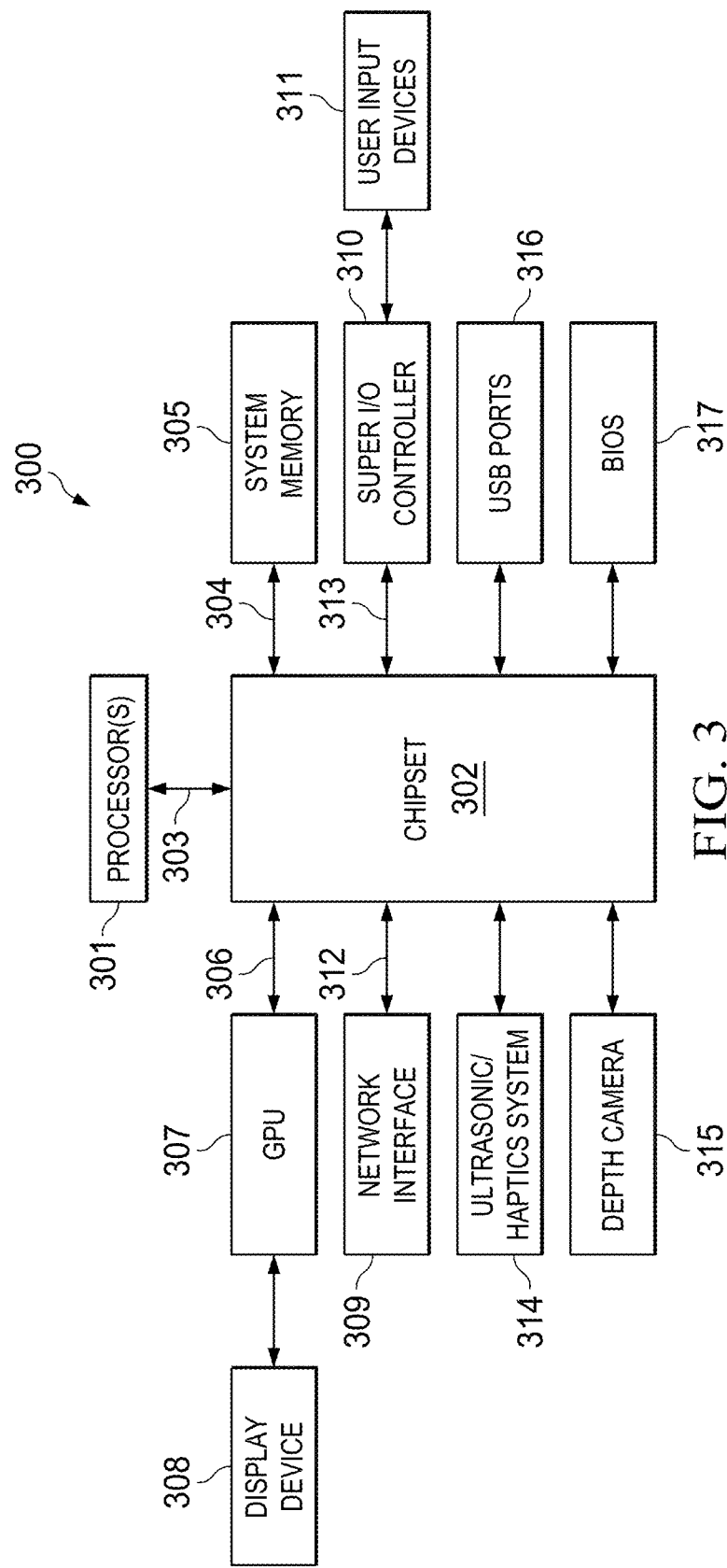
FIG. 3 is a block diagram of non-limiting examples of information handling system (IHS) components according to some embodiments.

FIG. 3 is a block diagram of non-limiting examples of IHS components according to some embodiments. In some cases, IHS 300 may be used as an external device in wired or wireless communication with xR headset 101. Additionally or alternatively, xR headset 101 may include component(s) of IHS 300.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

As shown in the implementation of FIG. 3, IHS 300 may include one or more processors 301. In various embodiments, IHS 300 may be a single-processor system including one processor 301, or a multi-processor system including two or more processors 301. Processor(s) 301 may include any processor capable of executing program instructions, such as any general-purpose or embedded processors implementing any of a variety of Instruction Set Architectures (ISAs).

IHS 300 includes chipset 302 that may have one or more integrated circuits that are coupled to processor(s) 301. In certain embodiments, chipset 302 may utilize a QPI (Quick-Path Interconnect) bus 303 for communicating with processor(s) 301. Chipset 302 provides processor(s) 301 with access to a variety of resources. For instance, chipset 302 provides access to system memory 305 over memory bus 304. System memory 305 may be configured to store program instructions executable by, and/or data accessible to, processors(s) 301. In various embodiments, system memory 305 may be implemented using any suitable memory technology, such as static RAM (SRAM), dynamic RAM (DRAM) or nonvolatile/Flash-type memory.

Chipset 302 may also provide access to Graphics Processing Unit (GPU) 307. In certain embodiments, graphics processor 307 may be disposed within one or more video or graphics cards that have been installed as components of the IHS 300. Graphics processor 307 may be coupled to chipset 302 via graphics bus 306 such as provided by an AGP (Accelerated Graphics Port) bus or a PCIe (Peripheral Component Interconnect Express) bus. In certain embodiments, a GPU 307 generates display data and provides it to xR headset 101 (or any other display device 308).

In certain embodiments, chipset 302 may also provide access to one or more user input devices 311. In those cases, chipset 302 may be coupled to a super I/O controller 310 that provides interfaces for a variety of user input devices 311, in particular lower bandwidth and low data rate devices. For instance, super I/O controller 310 may provide access to a keyboard and mouse or other peripheral input devices. In certain embodiments, super I/O controller 310 may be used to interface with coupled user input devices 311 such as keypads, biometric scanning devices, and voice or optical recognition devices. These I/O devices may interface with super I/O controller 310 through wired or wireless connections. In certain embodiments, chipset 302 may be coupled to super I/O controller 310 via Low Pin Count (LPC) bus 313.

Other resources may also be coupled to the processor(s) 301 of IHS 300 through chipset 302. In certain embodiments, chipset 302 may be coupled to network interface 309, such as provided by a Network Interface Controller (NIC) that is coupled to the IHS 300. For example, network interface 309 may be coupled to chipset 302 via PCIe bus 312. According to various embodiments, network interface 309 may also support communication over various wired and/or wireless networks and protocols (e.g., Wi-Fi, Bluetooth, etc.). In certain embodiments, chipset 302 may also provide access to one or more Universal Serial Bus (USB) ports 316.

Chipset 302 provides access to ultrasonic and haptics system 314; an example of which is discussed in more detail in FIG. 4 below. Chipset 302 also provides an interface between processor 301 and depth camera 315.

In some implementations, depth camera 315 may include two or more lenses with a separate image sensor or film frame for each lens, which enable camera 315 to simulate binocular vision and to capture three-dimensional images. Depth camera 315 may create a depth map based on those images, which in turn reveals information relating to the distance of the surfaces of object(s) from a given viewpoint (that is, the "depth" or actual "length" of an object).

In certain embodiments, chipset 302 may also provide access to any type of storage device. For instance, IHS 300 may utilize one or more magnetic disk storage devices, optical drives, solid state drives, or removable-media drives.

Upon powering or restarting IHS 300, processor(s) 301 may utilize instructions stored in Basic Input/Output System (BIOS) or Unified Extensible Firmware Interface (UEFI) chip or firmware 317 to initialize and test hardware components coupled to the IHS 300 and to load an Operating System (OS) for use by IHS 300. Generally speaking, BIOS 317 provides an abstraction layer that allows the OS to interface with certain hardware components that utilized by IHS 300. It is through this hardware abstraction layer that software executed by the processor(s) 301 of IHS 300 is able to interface with I/O devices that coupled to IHS 300.

In various embodiments, IHS 300 may not include each of the components shown in FIG. 3. Additionally or alternatively, IHS 300 may include various components in addition to those that are shown. Furthermore, some components that are represented as separate components in FIG. 3 may, in some embodiments, be integrated with other components. For example, in various implementations, all or a portion of the functionality provided by the illustrated components may instead be provided by components integrated into the one or more processor(s) 301 as a system-on-a-chip (SOC) or the like.

Figure 4:
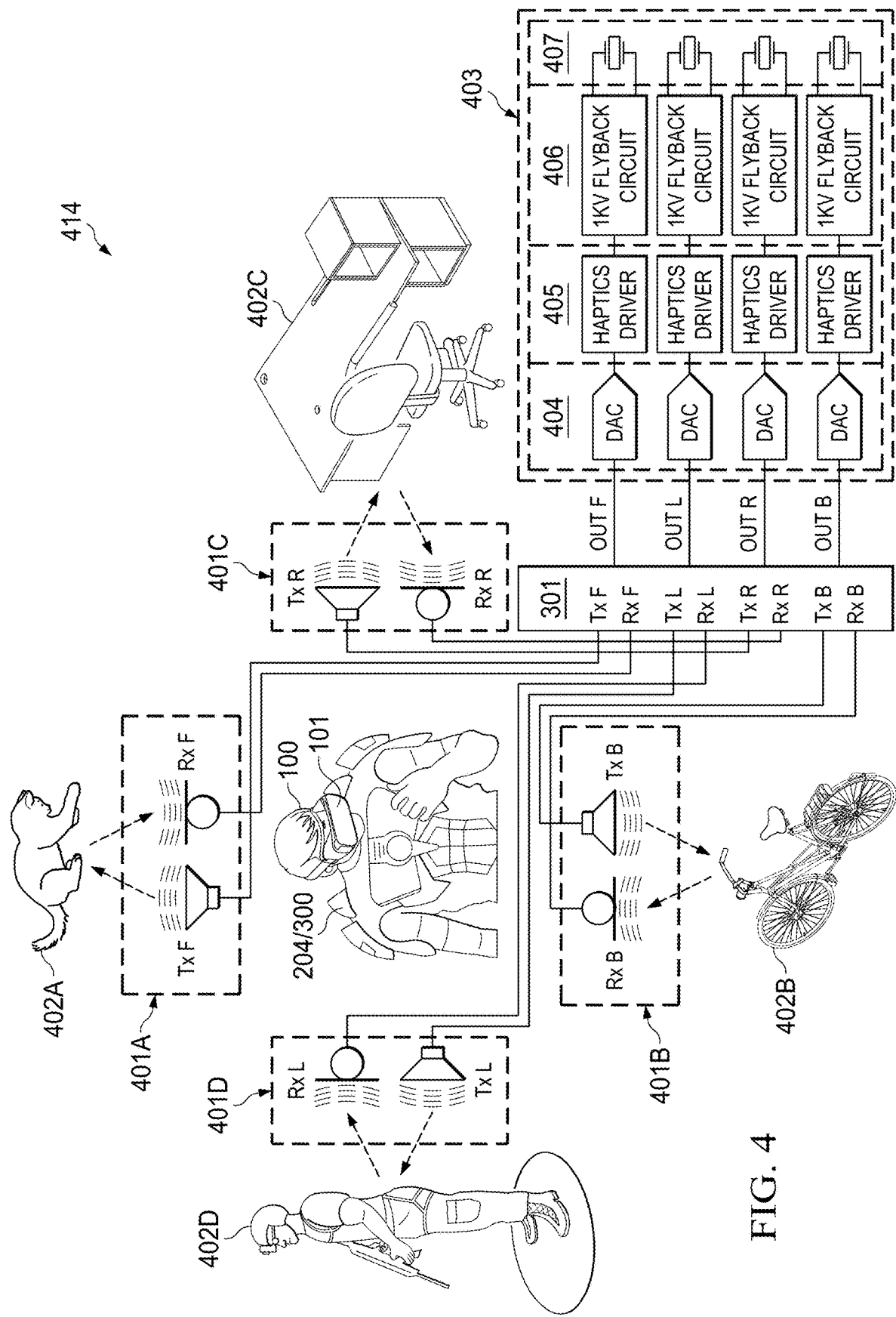
FIG. 4 is a block diagram of a non-limiting example of a system for ultrasonic collision management according to some embodiments.

FIG. 4 is a block diagram of a non-limiting example of ultrasonic collision management system 414. In this embodiment, user 100 wears backpack or vest 204 containing IHS 300. A plurality of ultrasonic transducers 401A-D (part of ultrasonic and haptics system 314) are configured to sense the presence of various physical objects 402A-D.

Each of transducers 401A-D may operate as an ultrasonic transmitter/receiver pair. Ultrasonic transducers convert alternating current (AC) signals into ultrasound, as well as the reverse, and may include piezoelectric or capacitive elements. Some systems may use separate transmitters and receivers, while others may combine both into a single piezoelectric element.

In this case, transducer 401A is aimed towards the front of user 100, transducer 401B is aimed towards the back of user 100, transducer 401C is aimed towards the right side of user 100, and transducer 401D is aimed towards the left side of user 100. Ultrasonic transducers 401A-D may be mounted on backpack or vest 204, and/or on xR headset 101, in their corresponding positions and/or directions.

In some implementations, ultrasonic transducers 401A-D may be provided in the form of one or more phased-arrays or the like. The beam or radiation pattern of a transducer array can be determined by the number of transducers and how they are disposed in the array, the active transducer area and shape, the ultrasound wavelength, and the speed of sound and/or impedance of the propagation medium.

Processor 301 is coupled to the input/output terminals of ultrasonic transducers 401A-D. In many cases, a signal processing circuit (not shown) may manipulate signals transmitted to and/or received by transducers 401A-D (e.g., analog-to-digital conversion, digital-to-analog conversion, amplification, etc.). Generally speaking, processor 301 causes transducer 401A to transmit an ultrasonic wave (e.g., 50 kHz), which is then received by transducer 401A as the result of a reflection/absorption of the ultrasonic wave by object 402A.

By comparing the received signal against the transmitted signal, IHS 300 may perform a number of operations. For example, IHS 300 may use ultrasonic transducers 401A-D to determine the presence of one or more physical objects or other users in the neighborhood of user 100, the location of each entity, the linear and angular velocity and/or acceleration of each entity, their sizes, etc.

In some cases, an ultrasonic signature of the physical object (e.g., a spectral response) may be compared against a database of known signatures to identify that object or type of object, and/or its composition, depending upon the object's ability to absorb and reflect ultrasonic waves of different frequencies. Additionally or alternatively, transducer 401A main continue transmit and receive the ultrasonic wave (e.g., periodically), to determine the object's change in position over time, if any, from which velocity and acceleration are determined. Beamforming may be used to direct the ultrasonic wave towards the current position of the object, as user 100 and/or the physical object moves during execution of an xR application.

Processor 301 is also coupled to haptic circuitry 403 (of ultrasonic and haptics system 314). In this particular example haptic circuitry 403 is configured to control four haptic actuators 407 (e.g., front, back, left, and right of user 100) using digital-to-analog converters 404, piezo-driving circuitry 405, and buck-boost converter circuitry 406 (e.g., a 1 kV flyback circuit). In various implementations, haptic circuitry 403 may be used by IHS 300 to provide haptic feedback in response to the detection of a potential physical interaction between user 100 and one or more of objects 402A-D.

Figure 5:
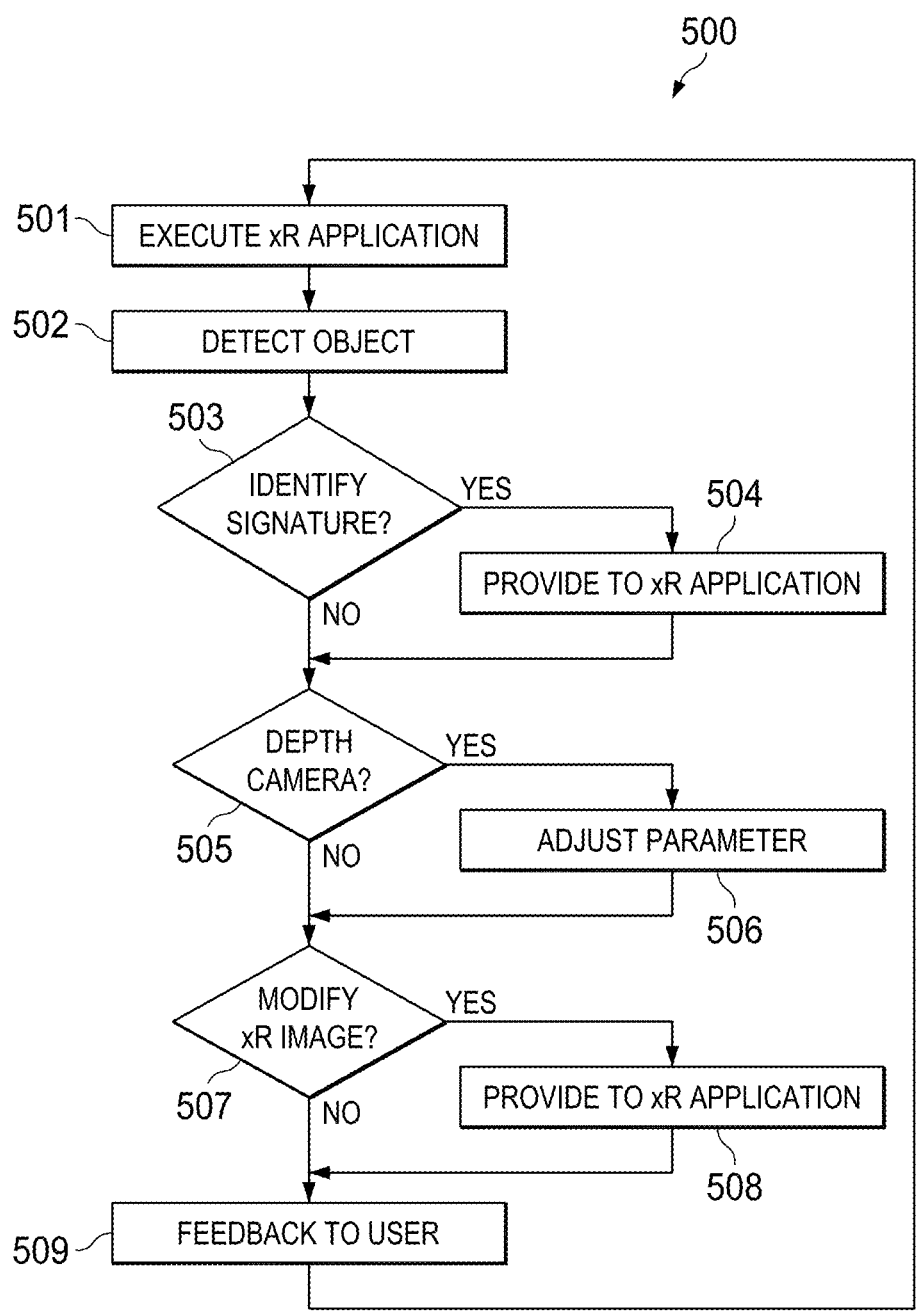
FIG. 5 is a flowchart of a non-limiting example of a method for ultrasonic collision management according to some embodiments.

FIG. 5 is a flowchart of a non-limiting example of an ultrasonic collision management method. In some embodiments, method 500 may be performed by controller 200 of xR headset 101 and/or processor(s) 301 of IHS 300. Specifically, at block 501, method 500 may execute an xR application. Examples of xR applications include, but are not limited to: architecture, visual art, commerce, education, emergency services, video games, medical, military, navigation, and workplace applications. In any of these applications, user 100 may wear xR headset 101 in order to interact with one or more digitally-generated entities displayed by xR headset 101.

At block 502, method 500 may detect a physical object in the neighborhood of user 100, for example, using ultrasonic transducers 401A-D. As part of detection 502, method 500 may identify a number of characteristics of that object. For example, block 501 may determine one or more of: the identity of the physical object, a position, location or distance of the physical object relative to user 100 (or to a reference point in a room where the xR application is being executed), whether the physical object is stationary or moving, a linear and/angular velocity of the physical object, a size of the physical object, a shape of the physical object, etc. Examples of physical objects include other users, walls, and any other physical object present in user 100's physical, real-world space.

If the ultrasonic signature of the object is correlated with a stored, known ultrasonic signature, block 503 recognizes a match and therefore the identity of the physical object; and block 504 provides that identity to the xR application. In response to receiving the identity of the object at block 504, the xR application may perform a number of operations.

For example, in some cases the xR application may determine whether there is likely to be a physical interaction (e.g., a collision, touch, etc.) between the user and the physical object during execution of the xR application, for example, by comparing the position, velocity, and/or acceleration of user 100 (e.g., determined using inertial sensors mounted upon xR headset 101) against the position, velocity, and/or acceleration of the physical object (e.g., determined using ultrasonic transducers 401A-D) using kinematics principles and equations.

At block 505, method 500 may use a depth camera (e.g., camera 315), if present, to supplement the information gathered by ultrasound sensors 401A-D. When user 100 is standing near an obstacle, a tall user's arm reach is longer than a short person's arm reach. Thus, a tall person's arm may be within a few inches from a wall, for instance, whereas a short person, standing in the same location, having shorter arm reach, may be a foot or more away from that same wall.

By using depth camera 315 to measure the user's arm length or height, block 506 may corrects the distance reported by ultrasonic sensors 401A-D to adjust one or more parameters (e.g., size, distance, etc.) usable to evaluate a future, potential physical interaction between the user and a physical object.

At block 507, method 500 may determine whether to modify an xR image being displayed by xR headset 100, and, if so, that information is relayed to the xR application. For instance, at block 508, the xR application may render an aspect (e.g., color, position, a shape, size, etc.) of the physical object as a digitally-generated entity in the xR image. Additionally or alternatively, the xR application may indicate, using the digitally-generated entity, whether the physical object is stationary or in motion.

The digitally-generated entity may be superimposed or displayed alongside at least a portion of the physical object. In some cases, the digitally-generated entity may replace the physical object entirely in the user's field of view. In other cases, the digitally-generated entity may replace a portion of the physical object, and a remainder of the object may still be directly visible by user 100.

If the physical object is another user of another IHS participating in the same xR application, for example, the digitally-generated entity may identify a role of the other user in the xR application. For example, if the xR application is a video game, an avatar, icon, uniform or shirt color, body outline (or "aura"), etc. may represent the other user's role or team as the game is being played.

At block 509, method 500 provides feedback to user 100, for example, using haptic actuators 407 of haptic circuitry 403. In some cases, the magnitude and/or frequency of the vibrations provided by actuators 407 may be controlled in different ways. For instance, if the distance between the user and the physical object is above a threshold value, the vibrations may be soft/and or separated by a larger interval of time. Then, as the user and the physical object approach each other and the distance is reduced below the threshold value, the intensity of the vibrations and/or its periodicity may increase.

When depth camera 315 is available, the haptics feedback system may be based upon the user's arm reach rather than the user's body or torso. This ensures all users can adequately protect themselves from hitting objects using ultrasonics, regardless of their height or reach.

In various implementations, the feedback provided by haptic circuitry 403 may direct the user to prevent the physical interaction. For example, haptic vibrations may be configured to inform the user to stop from hitting the physical object, to inform the user to move out of the physical object's trajectory, and/or to inform the user to assume a different posture (e.g., from standing up to crouching down, etc.) intended to avoid the physical interaction.

Alternatively, the feedback may direct the user to pursue the physical interaction. For example, haptic vibrations may be configured to inform the user to touch or hit the physical object, to inform the user to position themselves in the trajectory of the physical object, and/or to inform the user to assume a different posture intended to promote or enable the physical interaction (e.g., from laying down to standing up, etc.).

Although method 500 is described as providing haptic feedback, it should be noted that other types of feedback, including audio and/or video feedback, may also be provided to user 100 in anticipation of a potential collision.

Figure 6:
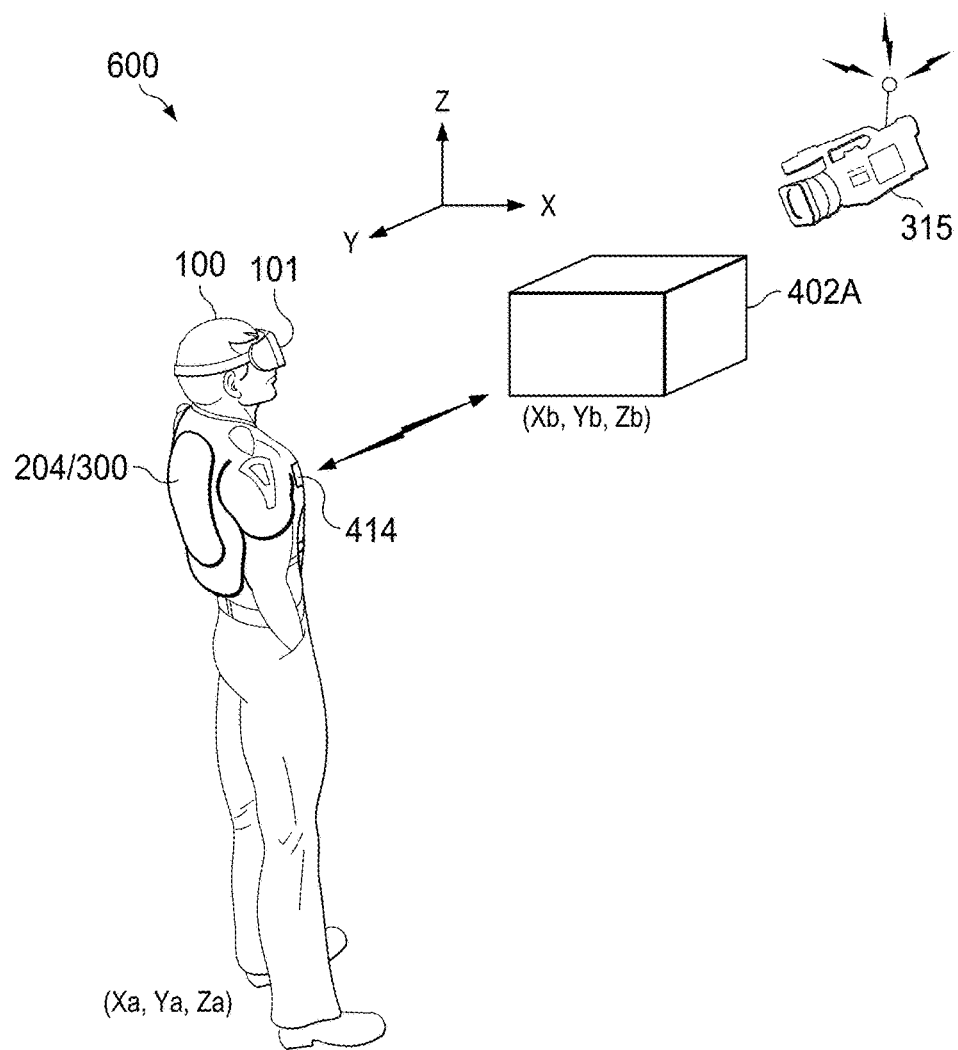
FIG. 6 is a diagram of a non-limiting example of an environment where systems and methods for ultrasonic collision management may be used according to some embodiments.

FIG. 6 is a diagram of a non-limiting example of an ultrasonic collision management environment according to some embodiments. As shown, user 100, wearing both xR headset 101 and backpack 204 containing IHS 300 and coupled to ultrasonic and haptics system 414, is allowed to move freely around room 600. Depth camera 315 may be wirelessly coupled to IHS 300. Sensors 104A-N in xR headset 101 enable IHS 300 to determine the position, velocity acceleration, gaze, perspective, etc. of user 100, which are in turn used to identify the position $(X_A, Y_A, Z_A)$ of user 100 in room 600 in a given coordinate system (X, Y, Z).

Ultrasonic and haptics system 414 is used to detect physical object 402A and its position in room 600 $(X_B, Y_B, Z_B)$. Using the systems and methods described herein, IHS 300 may determine whether or not a potential collision between user 100 and object 402A is likely to occur. If so, ultrasonic and haptics system 414 may provide haptic feedback to user 100.

Figure 7:
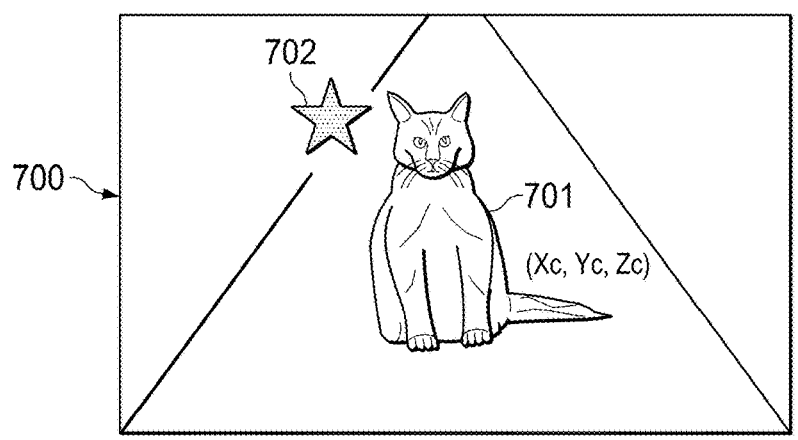
FIG. 7 is a screenshot of a non-limiting example of an xR image according to some embodiments.

FIG. 7 is a screenshot of a non-limiting example of an xR image. As shown, object 402A has been replaced by a digitally-created entity 701 in xR image 700 being provided to user 100 via xR headset 101, in response to the ultrasonic detection of physical object 402A. In this example, the entire object 402A is rendered and/or completely replaced by avatar 701 in xR image 701. Additionally or alternatively, another digitally-generated entity 702 such as an icon or other graphics may be displayed alongside object 402A, still visible as a physical object (e.g., in AR or MR) through xR headset 101 as part of image 700.

As the user's position with respect to physical object 402A changes, xR image 700 may be dynamically modified to place digitally-generated entities 701 or 702 in a corresponding position in xR image 700.

The advantages of using ultrasound, as opposed to only using multiple or depth cameras on xR headset 101, abound. For example, it is not practical to have four depth cameras mounted around xR headset 101 to scan the user's surrounding. Also, the power consumption of a depth camera is at least ten times higher than the power consumption of an ultrasonic sensor. Moreover, the physical size of a depth camera is much larger than that of an ultrasonic sensor.

In addition, depth cameras, when used alone, do not work in a number of use cases, such as when the user is in a room having glass, windows, or mirrors, as well as transparent or translucent objects. A camera sees through the glass or window, and therefore cannot detect the glass wall. But, even in this scenario, ultrasonic techniques described herein still work, reflecting off the glass surface and detecting the glass, window, mirror, and/or transparent or translucent objects. Of course, as described above, certain systems and methods described herein may employ depth camera 415 to detect limb length and/or height of the user.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
execute a virtual reality, augmented reality, or mixed reality (xR) application to display an xR image to a user of the IHS;
detect, via an ultrasonic sensor coupled to the processor, a potential collision between the user and a physical object during execution of the xR application by comparing a position, a velocity, and an acceleration of the user with a position, a velocity, and an acceleration of the physical object; and in response to the ultrasonic detection, instruct the user to lay down or stand up to cause the collision using haptic system coupled to a user's vest or backpack, wherein the haptic system comprises haptic circuitry configured to control four haptic actuators located in the front, back, left, and right of the user using a set of digital-to-analog converters (DACs), piezo-driving circuitry coupled to the DACs, and flyback circuitry coupled to the piezo-driving circuitry that controls a vibration of at least one of the haptic actuators, and wherein (a) if a distance between the user and the physical object is above a threshold value, decrease at least one of: an intensity of the vibration or a frequency of the vibration, and (b) if the distance is below the threshold value, increase at least one of: the intensity of the vibration or the frequency of the vibration.

2. The IHS of claim 1, wherein the IHS includes a headset worn by the user during execution of the xR application.

3. The IHS of claim 2, wherein the ultrasonic sensor includes an ultrasonic transducer array.

4. The IHS of claim 1, wherein the physical object is transparent or translucent, and wherein the collision is a collision between the user and the physical object.

5. The IHS of claim 1, wherein the physical object is another user of another IHS executing another instance of the xR application.

6. The IHS of claim 1, wherein the program instructions, upon execution, further cause the IHS to provide feedback to the user regarding the potential collision.

7. The IHS of claim 1, wherein the program instructions, upon execution, further cause the IHS to, in response to the ultrasonic detection, render an aspect of the physical object as a digitally-generated entity in the xR image, and wherein the aspect includes at least one of: a color, a shape, or a size of the physical object.

8. The IHS of claim 7, wherein the program instructions, upon execution, further cause the IHS to indicate, using the digitally-generated entity, whether the physical object is stationary or in motion.

9. The IHS of claim 7, wherein the digitally-generated entity is superimposed or displayed alongside at least a portion of the physical object or a digital representation of the physical object in the xR image.

10. The IHS of claim 7, wherein the physical object is another user of another IHS participating in the xR application, and wherein the digitally-generated entity identifies a role of the user in the xR application.

11. The IHS of claim 10, wherein the xR application is a video game.

12. The IHS of claim 1, wherein the program instructions, upon execution, further cause the IHS to identify an aspect of the physical object using the ultrasonic sensor.

13. The IHS of claim 12, wherein the aspect includes at least one of: identity, size, or shape of the physical object.

14. The IHS of claim 1, wherein the program instructions, upon execution, further cause the IHS to calculate the distance between the user and the physical object.

15. The IHS of claim 14, wherein the program instructions, upon execution, further cause the IHS to:

identify, using a depth camera coupled to the processor, a feature selected from the group consisting of: a user's arm's length, or a user's height; and adjust the distance according to the feature.

16. A method, comprising:

executing a virtual reality, augmented reality, or mixed reality (xR) application that displays an xR image to a user wearing a headset;

detecting, using an ultrasonic sensor, a potential collision between the user and a physical object during execution of the xR application by comparing a position, a velocity, and an acceleration of the user with a position, a velocity, and an acceleration of the physical object; and in response to the ultrasonic detection, instructing the user to lay down or stand up to cause the collision using a haptic system coupled to a user's vest or backpack, wherein the haptic system comprises haptic circuitry configured to control four haptic actuators located in the front, back, left, and right of the user using a set of digital-to-analog converters (DACs), piezo-driving circuitry coupled to the DACs, and flyback circuitry coupled to the piezo-driving circuitry that controls a vibration of at least one of the haptic actuators, and wherein (a) if a distance between the user and the physical object is above a threshold value, decrease at least one of: an intensity of the vibration or a frequency of the vibration, and (b) if the distance is below the threshold value, increase at least one of: the intensity of the vibration or the frequency of the vibration.

17. A hardware memory storage device having program instructions stored thereon that, upon execution by a processor, cause the processor to:

execute a virtual reality, augmented reality, or mixed reality (xR) application that displays an xR image to a user wearing a headset;

detect, using an ultrasonic sensor, a potential collision between the user and a physical object during execution of the xR application by comparing a position, a velocity, and an acceleration of the user with a position, a velocity, and an acceleration of the physical object; and in response to the ultrasonic detection, instruct the user to lay down or stand up to cause the collision using a haptic system coupled to a user's vest or backpack, wherein the haptic system comprises haptic circuitry configured to control four haptic actuators located in the front, back, left, and right of the user using a set of digital-to-analog converters (DACs), piezo-driving circuitry coupled to the DACs, and flyback circuitry coupled to the piezo-driving circuitry that controls a vibration of at least one of the haptic actuators, and wherein (a) if a distance between the user and the physical object is above a threshold value, decrease at least one of: an intensity of the vibration or a frequency of the vibration, and (b) if the distance is below the threshold value, increase at least one of: the intensity of the vibration or the frequency of the vibration.

* * * * *